(12) United States Patent
Salla et al.

(10) Patent No.: US 9,976,073 B2
(45) Date of Patent: May 22, 2018

(54) METHODS AND SYSTEMS FOR CONTROLLABLY GENERATING HEAT AND/OR NITROGEN GAS IN SUBTERRANEAN AND PIPELINE OPERATIONS

(71) Applicant: Halliburton Energy Services, Inc., Houston, TX (US)

(72) Inventors: Rajender Salla, Pune (IN); Mario Cyril Pinto, Pune (IN); Snehalata Sachin Agashe, Pune (IN); Neelam Deepak Raysoni, Pune (IN); Mdmonsur Alam, Doha (QA)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/308,295

(22) PCT Filed: Jun. 2, 2014

(86) PCT No.: PCT/US2014/040492
§ 371 (c)(1),
(2) Date: Nov. 1, 2016

(87) PCT Pub. No.: WO2015/187122
PCT Pub. Date: Dec. 10, 2015

(65) Prior Publication Data
US 2017/0073571 A1 Mar. 16, 2017

(51) Int. Cl.
*C09K 8/592* (2006.01)
*C09K 8/524* (2006.01)
(Continued)

(52) U.S. Cl.
CPC .............. *C09K 8/592* (2013.01); *C09K 8/032* (2013.01); *C09K 8/524* (2013.01); *C09K 8/56* (2013.01);
(Continued)

(58) Field of Classification Search
CPC ........ C09K 8/592; C09K 8/032; C09K 8/524; C09K 2208/24; C09K 2208/26; C09L 8/62; C09L 8/72; E21B 43/26; E21B 37/06
(Continued)

(56) References Cited

U.S. PATENT DOCUMENTS

| 4,219,083 A | 8/1980 | Richardson et al. |
| 4,232,741 A | 11/1980 | Richardson et al. |

(Continued)

FOREIGN PATENT DOCUMENTS

| EP | 0956427 B1 | 11/1999 |
| EP | 2061949 A1 | 5/2009 |

(Continued)

OTHER PUBLICATIONS

International Search Report and Written Opinion issued in related PCT Application No. PCT/US2014/040492 dated Feb. 13, 2015, 11 pages.

(Continued)

*Primary Examiner* — Silvana C Runyan
(74) *Attorney, Agent, or Firm* — Craig Roddy; Baker Botts L.L.P.

(57) ABSTRACT

Methods and systems for generating heat and/or nitrogen gas in subterranean operations, pipelines, and other related operations are provided. In one embodiment, the methods comprise: providing a treatment composition comprising a carrier fluid, a delayed acid generating component, a first reactant, and a second reactant, wherein the first and second
(Continued)

reactants are selected for being capable of reacting in an exothermic chemical reaction or a chemical reaction that produces nitrogen gas; and introducing the treatment composition into at least a portion of a conduit, container, or subterranean formation.

18 Claims, 2 Drawing Sheets

(51) Int. Cl.
  *C09K 8/62*    (2006.01)
  *C09K 8/72*    (2006.01)
  *C09K 8/03*    (2006.01)
  *C09K 8/56*    (2006.01)
  *E21B 37/06*   (2006.01)

(52) U.S. Cl.
  CPC ............... *C09K 8/62* (2013.01); *C09K 8/72* (2013.01); *E21B 37/06* (2013.01); *C09K 2208/24* (2013.01); *C09K 2208/26* (2013.01)

(58) Field of Classification Search
  USPC .................................................. 166/300
  See application file for complete search history.

(56) References Cited

U.S. PATENT DOCUMENTS

| | | | |
|---|---|---|---|
| 4,330,037 A | | 5/1982 | Richardson et al. |
| 4,755,230 A | | 7/1988 | Ashton et al. |
| 4,846,277 A | * | 7/1989 | Khalil ............... C09K 8/703 166/280.1 |
| 4,848,468 A | | 7/1989 | Hazlett et al. |
| 5,183,581 A | | 2/1993 | Khalil et al. |
| 5,824,160 A | | 10/1998 | Khalil et al. |
| 5,891,262 A | | 4/1999 | Khalil et al. |
| 6,311,773 B1 | * | 11/2001 | Todd ................. C09K 8/68 166/280.2 |
| 7,624,743 B2 | | 12/2009 | Sarkar et al. |
| 8,220,543 B2 | | 7/2012 | Clark et al. |
| 2006/0144591 A1 | * | 7/2006 | Gonzalez ............ E21B 29/10 166/277 |
| 2007/0187096 A1 | * | 8/2007 | Pauls ................... C09K 8/74 166/280.1 |
| 2008/0139415 A1 | | 6/2008 | Todd et al. |
| 2008/0271888 A1 | * | 11/2008 | Huang ................ C09K 8/5045 166/279 |
| 2011/0146987 A1 | | 6/2011 | Williamson |
| 2013/0126169 A1 | | 5/2013 | Al-Nakhli et al. |

FOREIGN PATENT DOCUMENTS

| | | |
|---|---|---|
| EP | 2436872 A2 | 4/2012 |
| WO | 98/31917 A1 | 7/1998 |
| WO | 2008/032067 A1 | 3/2008 |

OTHER PUBLICATIONS

Halliburton Energy Services, Inc., SureTherm Service brochure, http://www.halliburton.com/public/bc/contents/Data_Sheets/H07615.pdf, 2012, 2 pages.
Halliburton Energy Services, Inc., N-Flow, http://www.halliburton.com/public/bar/contents/Data_Sheets/web/Sales_Data_Sheets/H09166.pdf, 2014, 2 pages.
Salgaonkar, Lalit, and Achala Danait. "Environmentally Acceptable Emulsion System: An Effective Approach for Removal of Asphaltene Deposits." SPE Paper 160877, SPE Saudi Arabia Section Technical Symposium and Exhibition. Society of Petroleum Engineers, 2012.
Frost et al. "New, Highly Effective Asphaltene Removal System With Favorable HSE Characteristics." SPE Paper 112420, SPE International Symposium and Exhibition on Formation Damage Control. Society of Petroleum Engineers, 2008.
Murtaza, S., et al. "Wellbore Asphaltene Cleanout Using a new Solvent Formulation in a Horizontal Openhole oil Producer in Carbonate Reservoir of North Ghawar Field-Scripting a Success Story." SPE Paper 164434, SPE Middle East Oil and Gas Show and Conference. Society of Petroleum Engineers, 2013.
H2Zero Service Data Sheet: http://www.halliburton.com/public/pe/contents/Data_Sheets/web/H/H00216.pdf.
Vasquez, Julio Estuardo, and Ian Andrew Fowler. "A Novel Temperature-Activated, Rigid-Setting Material: Case Histories and Lessons Learned After More than 500 Well Interventions for Drilling and Conformance Applications." SPE Paper 166221, SPE Annual Technical Conference and Exhibition. Society of Petroleum Engineers, 2013.
Vasquez, Julio Estuardo. "A Novel Temperature-Activated, Rigid-Setting Material: Case Histories for Drilling and Conformance Offshore Applications." OTC 24417, OTC Brasil. Offshore Technology Conference, 2013.
Sand Trap Formation Consolidation http://www.halliburton.com/public/pe/contents/Data_Sheets/web/H/H04206.pdf.
Davies et al. "Field application of in-situ nitrogen gas generation system." Middle East Technical Conference and Exhibition. SPE Paper 9653, Society of Petroleum Engineers, 1981.
AquaLinear HT Data Sheet http://www.halliburton.com/public/pe/contents/Data_Sheets/web/H/H06780.pdf.
Parker, M. A., and S. B. Laramay. "Properties and application of delayed-release breakers." SPE Paper 24300, SPE Mid-Continent Gas Symposium. Society of Petroleum Engineers, 1992.
Patil, Prajakta et al. "Novel controlled-Release breakers for high-temperature fracturing." SPE Paper 164656, North Africa Technical Conference and Exhibition. Society of Petroleum Engineers, 2013.
Shuchart, Chris E., et al. "Novel oxidizing breaker for high-temperature fracturing." SPE Paper, 37228, International Symposium on Oilfield Chemistry. Society of Petroleum Engineers, 1997.
Walker, Michael L., et al."Effects of oxygen on fracturing fluids." SPE Paper 28978, SPE International Symposium on Oilfield Chemistry. Society of Petroleum Engineers, 1995.
Villesca, Josue, et al. "Development and Field Applications of an Aqueous-Based Consolidation System for Proppant Remedial Treatments." SPE Paper 128025, SPE International Symposium and Exhibiton on Formation Damage Control. Society of Petroleum Engineers, 2010.
Foo et al. "Successful Application of Aqueous-Based Formation Consolidation Treatment Introduced to the North Sea." SPE/ICoTA Coiled Tubing & Well Intervention Conference & Exhibition. SPE Paper 163880, Society of Petroleum Engineers, 2011.
Nguyen et al. "Foaming Aqueous-Based Curable Treatment Fluids Enhances Placement and Consolidation Performance." SPE Paper 151002, SPE International Symposium and Exhibition on Formation Damage Control. Society of Petroleum Engineers, 2012.
McSpadden, H. W., M. L. Tyler, and T. T. Velasco. "In-Situ Heat and Paraffin Inhibitor Combination Prove Cost Effective in NPR# 3, Casper Wyoming." SPE Paper 15098, SPE California Regional Meeting. Society of Petroleum Engineers, 1986.
Ashton, J. P., et al. "In-situ heat system stimulates paraffinic-crude producers in Gulf of Mexico." SPE Production Engineering 4.02 (1989): 157-160.
Singh, Probjot, and H. Scott Fogler. "Fused chemical reactions: The use of dispersion to delay reaction time in tubular reactors." Industrial & engineering chemistry research 37.6 (1998): 2203-2207.
Glasbergen, Gerard, et al. "Real-time fluid distribution determination in matrix treatments using DTS." SPE Paper 107775, SPE Production & Operations 24.01 (2009): 135-146.
Glasbergen, Gerard, et al. "Real-Time Diversion Quantification and Optimization Using DTS." SPE Paper 110707, SPE Annual Technical Conference and Exhibition. Society of Petroleum Engineers, 2007.
Nowak, T. J. "The estimation of water injection profiles from temperature surveys." Journal of Petroleum Technology 5.08 (1953): 203-212.

(56) References Cited

OTHER PUBLICATIONS

Halliburton Energy Services, Inc., SureTherm Technology Bulletin, 2010, 16 pages.
Halliburton Energy Services, Inc., SureTherm Pipeline Cleaning Brochure, 2010, 2 pages.
Halliburton Energy Services, Inc., SureTherm Service Brochure, 2-238, 2010, 1 page.
Halliburton Energy Services, Inc., N-Flow QuickSheet brochure, 2014, 2 pages.
Halliburton Energy Services, Inc., N-Flow Technology Bulletin, 2009, 28 pages.
Halliburton Energy Services, Inc., N-Flow 325, Material Safety Data Sheet, 2012, 6 pages.
Halliburton Energy Services, Inc., N-Flow 408, Material Safety Data Sheet, 2010, 6 pages.
Halliburton Energy Services, Inc., N-Flow 408 Breaker Fluid, Material Safety Data Sheet, 2011, 6 pages.
Halliburton Energy Services, Inc., N-Flow 412, Material Safety Data Sheet, 2010, 6 pages.
Sciencelab.com, Sodium Nitrite Material Safety Data Sheet, 2012, 6 pages.
Halliburton Energy Services, Inc., ST-A, Material Safety Data Sheet, 2010, 7 pages.
Halliburton Energy Services, Inc., ST-B, Material Safety Data Sheet, 2010, 7 pages.
Halliburton Energy Services, Inc., ST-C, Material Safety Data Sheet, 2010, 6 pages.
Sierra, J., et al. "DTS Monitoring Data of Hydraulic Fracturing: Experiences and Lessons Learned. Paper SPE 116182 presented at the SPE Annual Technical Conference and Exhibition, Denver, Sep. 21-24." (2008).

\* cited by examiner

METHODS AND SYSTEMS FOR CONTROLLABLY GENERATING HEAT AND/OR NITROGEN GAS IN SUBTERRANEAN AND PIPELINE OPERATIONS

CROSS-REFERENCE TO RELATED APPLICATION

The present application is a U.S. National Stage Application of International Application No. PCT/US2014/040492 filed Jun. 2, 2014, which is incorporated herein by reference in its entirety for all purposes.

BACKGROUND

The present disclosure relates to methods and systems for generating heat and/or nitrogen gas in subterranean operations, pipelines, and other related operations.

Crude oil produced from subterranean formations typically contains many kinds of hydrocarbons, including paraffin wax. Paraffin wax is typically dissolved crude oil at higher temperatures and/or pressures. However, paraffin wax tends to precipitate from crude oil in waxy solid deposits when the pressure and temperature is lowered as the hydrocarbon is produced and as the crude oil cools down. Paraffin wax deposition in well bores, tubing, and/or pipelines may obstruct the flow of oil and/or other fluids, lowering oil production and interfering with transportation. Asphaltenes are also a problem in crude oil production in many areas around the world. Asphaltenes may precipitate as solids in the matrix of the formation, in a previously-created fracture in the formation, in the wellbore, or in production tubing. Asphaltenes that precipitate in the formation at lower temperatures can result in plugging of the pores in the matrix of the subterranean formation.

Certain subterranean operations often involve the use of chemical additives and systems such as viscosifying agents, breakers, resins, crosslinking agents, and the like. In many instances, these additives may be more effective or less effective at certain temperatures. For example, certain chemical breakers may not effectively reduce the viscosity of fluids at temperatures below about 200° F., and certain types of crosslinking agents and breakers may be activated only at certain temperatures. Moreover, many encapsulated breakers, crosslinking agents, and other additives may not diffuse out of their encapsulants effectively at lower temperatures. Finally, certain resins may at least partially cure at certain temperatures in a formation, increasing their viscosity and making them increasingly difficult to pump down a well bore. In many subterranean operations, it is often desirable to delay the activity of many of these chemical additives until they reach a selected location downhole. However, temperature conditions in various portions of a subterranean formation may or may not provide effective conditions for activating or delaying these additives.

BRIEF DESCRIPTION OF THE FIGURES

These drawings illustrate certain aspects of some of the embodiments of the present disclosure, and should not be used to limit or define the disclosure.

Figure 1:
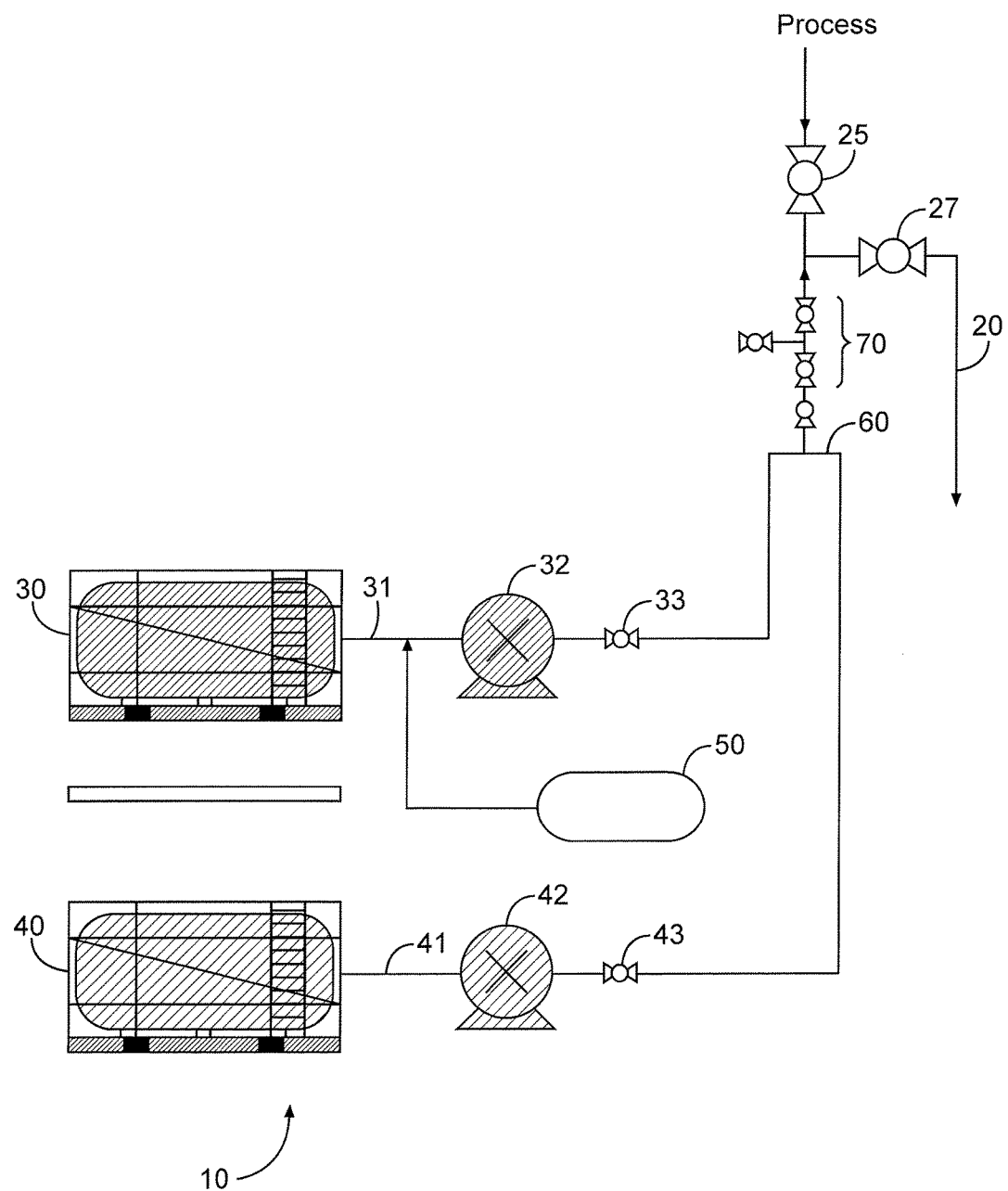
FIG. 1 is a diagram illustrating an example injection system used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure. As used herein, terms such as "first" and "second" are arbitrarily assigned and are merely intended to differentiate between two or more reactants. It is to be understood that the words "first" and "second" serve no other purpose and are not part of the name or description of the reactant. Furthermore, it is to be understood that that the mere use of the term "first" and "second" does not require that there be any "third" or further reactant, although that possibility is contemplated under the scope of the present invention.

The present disclosure relates to methods and systems for generating heat and/or nitrogen gas in subterranean operations, pipelines, and other related operations. Specifically, the methods and compositions of the present disclosure generally involve using a delayed acid generating component to control the chemical reaction of two or more reactants that generates heat, so that it may be generated in a well bore, subterranean formation, or other location at the desired time and/or location. The treatment compositions of the present disclosure generally comprise: a carrier fluid; a delayed acid generating component; a first reactant; and a second reactant, wherein the first and second reactants are selected for being capable of reacting together in an exothermic chemical reaction and/or to produce nitrogen gas. The methods of the present disclosure generally comprise introducing such a treatment composition into at least a portion of a well bore, subterranean formation, and/or pipeline, where the heat generated may be used for one or more applications, treatments, and/or operations therein. In certain embodiments, the reaction of the first and second reactants also may produce nitrogen gas, which may be used for one or more applications, treatments, and/or operations as well.

The methods, compositions, and additives of the present disclosure may, among other benefits, may enable greater control in the use of certain thermally-activated treatments, for example, by allowing for a longer delay in triggering the reactions that generate heat, and/or controlling the amount of heat generated by those reactions. In certain embodiments, the methods and compositions of the present disclosure may enable a delay of more than about 1 hour from the time the reactants are mixed in a treatment fluid at temperatures of about 30° C. In certain embodiments, the delay may be about 4 hours at temperatures of about 30° C. In certain embodiments, the delay may be about 1 hour or more at temperatures of about 90° C. This may, among other benefits, enable and/or enhance the use of such thermally-activated treatments in deep areas of well bores and/or subterranean formations, as well as long pipelines, particularly at higher temperatures. In certain embodiments, the delayed acid generating components used in the methods and compositions of the present disclosure may be more compatible in mixing with the carrier fluid and/or the first or second reactant than other acids used with thermally-activated treatments. In certain embodiments, the delayed acid generating components used in the methods and compositions of the present disclosure may be more environmentally-friendly than other acids used with thermally-activated treatments. In certain embodiments, the delayed acid generating components used in the methods and compositions of the present disclosure may permit operators to more accurately control the amount of heat produced by the exothermic reaction, which may facilitate the use of thermally-activated treatments in permafrost regions or other heat-sensitive environments. The reaction products of the exothermic reactions in certain embodiments of the present disclosure also may cause less damage to the formation (e.g., precipitates, corrosion, etc.) as compared to conventional treatments.

Components of the Treatment Compositions

The first and second reactants may comprise any reactants that react in the presence of an acid to produce heat and/or nitrogen gas. In certain embodiments, the first reactant comprises a source of cations (e.g., ammonium ions), and the second reactant comprises a source of anions (e.g., nitrite ions). In certain embodiments of the present disclosure, the first and second reactants may comprise sodium nitrite and ammonium chloride, respectively, which react according to Equation (1) below to produce heat and nitrogen gas.

$$NaNO_2 + NH_4Cl \rightarrow NaCl + H_2O + N_2 \quad (1)$$

The reaction in Equation (1) typically takes place at pH conditions of about 5 or lower. In other embodiments, the ammonium chloride in Equation (1) above may be replaced with magnesium ammonium phosphate (e.g., struvite). Examples of other exothermic reactions that may be used in accordance with certain embodiments of the present disclosure include Grignard reactions, as well as the reactions shown in Equations (2) and (3) below.

$$H_2O_2 + Fe^{2+} \rightarrow Fe^{3+} + HO^- + HO^* \quad (2)$$

$$2NH_3(g) + CO_2(g) \rightarrow H_2NC(O)NH_2(s) + H_2O(l) \quad (3)$$

In certain embodiments, the first and/or second reactants may be provided in a solid form, among other reasons, to help control the exothermic reaction so that the heat of reaction energy is released over a period of time instead of as an energy spike, although the control of the mixing of the reactants is not expected to substantially affect the total amount of heat that is generated. In certain embodiments, at least one of the reactants may be embedded in a solid matrix comprising a material that helps delay the release of the reactant. In certain embodiments at least one of the reactants can be encapsulated with an encapsulating material to form a solid capsule for the reactant. In still other embodiments, embedding at least one of the reactants in a solid matrix can be further combined with encapsulation of at least some of the reactant that is embedded in a solid matrix, among other reasons, to provide additional control over the exothermic reaction.

In certain embodiments, the first and second reactants may be provided in stoichiometric amounts based on their particular exothermic reaction. In certain embodiments, the first reactant and second reactants may be provided in solutions having molar concentrations of about 1.5M. In certain embodiments, the first and second reactants may be provided in solutions of molar concentrations of from about 0.01M to about 3M. A person of skill in the art with the benefit of the present disclosure will recognize the appropriate amounts of the first and second reactants to use for a particular application.

The delayed acid generating component generally comprises any compound that at least partially hydrolyzes in water to release an acid. Examples of delayed acid generating components that may be suitable for use in the present disclosure include, but are not limited to, esters, formates, lactic acid derivatives, methyl lactate, ethyl lactate, propyl lactate, and butyl lactate. Other suitable delayed acid generating component include: formate esters including, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Examples of esters also include esters or polyesters of glycerol including, but not limited to, tripropionin (a triester of propionic acid and glycerol), trilactin, and esters of acetic acid and glycerol such as monoacetin, diacetin, and triacetin. In certain embodiments, the delayed acid generating component may include aliphatic polyesters; poly(lactides); poly(glycolides); poly(ε-caprolactones); poly(hydroxy ester ethers); poly(hydroxybutyrates); poly(anhydrides); aliphatic polycarbonates; poly(orthoesters); poly(amino acids); poly(ethylene oxides); and polyphosphazenes; or copolymers thereof. Derivatives and combinations of any of the aforementioned examples also may be suitable. For example, various combinations of the esters or polyesters of hydroxy acid and/or glycerol also may be employed to adjust the half-life of the hydrolysis reactions.

The acid-generating compounds may be reacted with small amounts of reactive materials such as mineral acids, organic acids, acidic anhydrides, p-toluenesulfonic acid, etc. to lower the pH to accelerate the hydrolysis of the acid-generating compound. Similarly, the hydrolysis rate may be accelerated by the addition of a small amount of a strong base such as NaOH, $Na_2CO_3$, and $Mg(OH)_2$, however, the resultant acid may be neutralized by the presence of base. An acid may have a similar effect. The acid-generating compound also may generate alcohols downhole that may be beneficial to the operation. In certain embodiments, the delayed acid generating component can be encapsulated with an encapsulating material to form a solid capsule. In other embodiments, the delayed acid generating component may not be encapsulated. Examples of commercially-available delayed acid-generating compounds that may be suitable for use in the methods and compositions of the present disclosure include, but are not limited to N-FLOW 325, N-FLOW 408, and N-FLOW 412, all of which are available from Halliburton Energy Services, Inc.

In certain embodiments, the delayed acid generating component may be provided in an amount necessary to produce the requisite drop in pH to trigger the exothermic reaction of the first and second reactants. In certain embodiments, the delayed acid generating component may be used in an amount of about 5% to about 40% v/v. In certain embodiments, the delayed acid generating component may be used in an amount of about 5% to about 10% v/v. In certain embodiments, the delayed acid generating component may be used in an amount of about 5% to about 20% v/v. In certain embodiments, the delayed acid generating component may be used in an amount of about 10% to about 20% v/v. A person of skill in the art with the benefit of the present disclosure will recognize the appropriate amounts of the delayed acid generating component to use for a particular application.

The carrier fluids used in the methods and compositions of the present disclosure generally comprise any aqueous fluid known in the art, including emulsions that include an aqueous phase. Aqueous fluids that may be suitable for use in the methods and compositions of the present disclosure may comprise water from any source. Such aqueous fluids may comprise fresh water, salt water (e.g., water containing one or more salts dissolved therein), brine (e.g., saturated salt water), seawater, or any combination thereof. Emulsions that may be suitable for use in the methods and compositions of the present disclosure may comprise oil-in-water emulsions or water-in-oil emulsions (i.e., invert emulsions), wherein the aqueous phase of the emulsion comprises one or more aqueous fluids, including but not limited to those examples listed above. In certain embodiments, the density of the aqueous fluid can be adjusted, among other purposes, to provide additional particulate transport and suspension in the compositions of the present disclosure. In certain embodiments, the carrier fluid may further comprise a viscosifying agent, among other purposes, to help suspend solid material (e.g., the first and second reactants) in the carrier fluid. Examples of viscosifying agents that may be suitable for use in certain embodiments of the present disclosure include, but are not limited to, guar, guar derivatives, cellulose, cellulose derivatives, biopolymers, polysaccharides, certain surfactants, synthetic polymers, acrylamides, acrylates, and the like. In certain embodiments, the viscosifying agent may further comprise a crosslinking agent. In certain embodiments, the treatment fluid may further comprise a breaker for the viscosifying agent.

The carrier fluid optionally may comprise one or more additional additives for a variety purposes in conjunction with a method or composition of the present disclosure. Examples of such additional additives include, but are not limited to, weighting agents, surfactants, emulsifiers, acids, fluorides, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, relative permeability modifiers, resins, particulate materials (e.g., proppant particulates), wetting agents, coating enhancement agents, filter cake removal agents, and the like. A person skilled in the art, with the benefit of this disclosure, will recognize the types of additives that may be included in the fluids of the present disclosure for a particular application, as well as the additives that may be less suitable for a particular application. For example, a person of skill in the art with the benefit of this disclosure will recognize that acidic additives may trigger the reaction of the first and second reactants prematurely in some cases. In certain embodiments, the carrier fluid may comprise additional alkaline base additives, among other reasons, to further delay the exothermic reactions that take place under acidic conditions.

As noted above, the delay and/or amount of heat and/or nitrogen gas generated in the methods and compositions of the present disclosure may be adjusted for the requirements of a particular operation or treatment. This delay may be adjusted, for example, by selecting and/or varying the amounts of the first and/or second reactants, the amount and/or type of the delayed acid generating component, the addition of one or more additional additives (e.g., a base), and other factors. For example, in certain embodiments, one or more of the first reactant, the second reactant, the delayed acid generating component are provided in an amount that is based at least in part on a predetermined amount of nitrogen gas to be produced by the chemical reaction and/or a predetermined amount of heat to be produced by the exothermic chemical reaction. A person of ordinary skill in the art with the benefit of this disclosure will recognize how to vary these parameters to produce the desired amount of heat and/or nitrogen gas and the desired delay in the exothermic reaction.

A treatment composition of the present disclosure may be prepared by mixing the carrier fluid with the first and second reactants and the delayed acid-generating component by any means known in the art. The carrier fluid may be mixed with the reactants and/or the delayed acid-generating component at a well site or pipeline where the treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing.

In certain embodiments, the components of the treatment composition may be introduced into a subterranean formation or pipeline in a single carrier fluid. In other embodiments, two or more of those components may be introduced into a subterranean formation or pipeline separately (e.g., in separate carrier fluids), among other reasons, to prevent premature reaction of the reactants.

Examples of Treatment Methods

The methods and compositions of the present disclosure may be used during or in conjunction with any subterranean operation. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, clean-up treatments, conformance treatments, diversion treatments, consolidation treatments, and other operations where a treatment composition of the present disclosure may be useful.

In one embodiment, the methods and compositions of the present disclosure may be used in conjunction with treatments used to remove and/or inhibit the formation of paraffin wax, asphaltenes, and/or tar precipitates (e.g., deposits) in conduits, containers (e.g., shipment containers), tubulars, subterranean formations, well bores, and/or pipelines carrying hydrocarbons, for example, in hydrocarbon production, transportation, and/or refining operations. For example, a treatment composition comprising a carrier fluid, a delayed acid generating component, a first reactant, and a second reactant, wherein the first and second reactants are selected for being capable of reacting together in an exothermic chemical reaction may be introduced into a portion of a conduit, container, tubular, subterranean formation, well bore, or pipeline through which hydrocarbons flow. The exothermic reaction of the first and second reactants generates heat that increases the solubility of paraffins, asphaltenes, and/or tar in the fluids flowing in that area. After introducing the treatment composition into the subterranean formation, tubular, well bore, or pipeline, the delayed acid-generating component may hydrolyze in the carrier fluid to produce an acid, reducing the pH of the fluid to a level at which the exothermic reaction of the first and second reactants occurs. The heat generated in the exothermic reaction heats the area to help melt the paraffins, asphaltenes, and/or tar. The treatment composition optionally may include a liquid hydrocarbon solvent that is a liquid at standard temperature and pressure, which can help dissolve and remove the paraffins, asphaltenes, and/or tar. The carrier fluid can then be displaced from the section of conduit and help remove the paraffins, asphaltenes, and/or tar from subterranean formation, tubular, well bore, or pipeline.

In certain embodiments, the methods and compositions of the present disclosure may be effective in very long pipelines or well bores such as long horizontals and deep water wells at least in part because of the controllable and/or extended delay provided by the delayed acid-generating components used herein. In certain embodiments, the amount of heat generated using the methods and compositions of the present disclosure can be tailored and/or customized for the nature and/or amount of paraffins, asphaltenes, and/or tar deposits that must be dissolved or removed in a particular treatment. This may be accomplished, for example, by using a computer program as further described below. Among the many benefits of the treatments of the present disclosure, this may also reduce the amount of solvent needed to dissolve a particular amount of paraffins, asphaltenes, and/or tar deposits, increasing the environmental benefits of these methods and compositions. Moreover, in certain embodiments, nitrogen gas may be produced as a byproduct of the exothermic reaction, and nitrogen gas bubbles may help to mechanically dislodge or break up paraffin, asphaltene, and/or tar deposits in a subterranean formation, tubular, well bore, or pipeline.

In another embodiment, the methods and compositions of the present disclosure may be used in conjunction with fluid diversion or conformance treatments used to direct treatment fluids and/or additives to targeted zones in a subterranean formation or well bore, particularly in horizontal wells with long laterals. In such circumstances, a treatment fluid may dissipate in portions of the formation or well bore requiring less force to penetrate them (e.g., a heel portion of a lateral, or a more permeable portion of a formation), while other areas of the formation or well bore (e.g., the toe portion of a lateral, or a less permeable portion of a formation) may not be treated effectively. The methods and compositions of the present disclosure may be used to generate heat to trigger certain conformance and/or diversion materials that are thermally activated. For example, the H$_2$ZERO® conformance service provided by Halliburton Energy Services, Inc. uses a crosslinked polymer system with a thermally-activated crosslinker to form a gel that may divert the flow of water and/or other fluids away from an area of a formation or well bore. In one such embodiment, a treatment composition comprising a carrier fluid, a delayed acid generating component, a first reactant, and a second reactant, wherein the first and second reactants are selected for being capable of reacting together in an exothermic chemical reaction may be introduced into a portion of a subterranean formation or well bore. A diverting or conformance fluid comprising a viscosifying agent and a thermally-activated crosslinking agent also may be introduced into the portion of the subterranean formation (either separately or mixed together with one or more of the first and second reactants, carrier fluid, and/or delayed acid generating component). After introducing the treatment composition into the subterranean formation or well bore, the delayed acid-generating component may hydrolyze in the carrier fluid to produce an acid, reducing the pH of the fluid to a level at which the exothermic reaction of the first and second reactants occurs. The heat generated in the exothermic reaction activates the crosslinking agent, which crosslinks the viscosifying agent to form a gel. The gel then may divert the flow of water and/or other fluids from the particular portion of the subterranean formation or well bore. In certain embodiments, the first and/or second reactants and/or the delayed acid-generating component may be selectively introduced into a certain portion of the subterranean formation and/or well bore in order to activate a crosslinking agent in that portion of the formation or well bore while leaving crosslinking agent(s) in other portions of the formation or well bore un-activated. This may allow for more control in treating selected portions of a formation or well bore. For example, the first and/or second reactants and/or the delayed acid-generating component may preferentially enter a more permeable area of a subterranean formation, and selectively activate a crosslinking agent in that area. This may cause the formation of a gel that can divert the flow of water and/or other fluids toward a less permeable area of the formation. Other examples of thermally-activated conformance and diversion materials that may be used in accordance with the methods and compositions of the present disclosure include rigid setting materials, which may comprise a low viscosity system that is thermally-activated with a controlled set angle capable of quickly developing a high compressive strength for water, gas shut off, and drilling applications. Such rigid setting materials may be used in conjunction with a treatment composition of the present disclosure in a manner similar to that described above.

Because of the controllable and extended delay provided by the delayed acid-generating components used in the methods and compositions of the present disclosure, these treatments may be effective in very long well bores such as long horizontals and deep water wells. Because of the controllable amount of heat generated using the methods and compositions of the present disclosure, this treatment can be customized for the amount heat needed to activate the conformance or diversion material. This may be accomplished, for example, by using a computer program as further described below. As discussed below, in certain embodiments, the reaction of the first and second reactants may produce nitrogen gas, which may have additional utility as a diverting agent.

In another embodiment, the methods and compositions of the present disclosure may be used in conjunction with treatments where the viscosity of a viscosified fluid is reduced using a chemical breaker. Certain chemical breakers used to reduce the viscosity of a treatment fluid are often not capable of completely breaking a viscosified fluid at temperatures below about 200° F., and as such, may not achieve high regain permeability values in formations where they are used. The methods and compositions of the present disclosure may be used to generate heat to enhance the activity of breakers generally and/or to initiate diffusion to release encapsulated breakers into the viscosified fluid, which may (among other benefits) enhance regain permeability. In one such embodiment, a treatment composition comprising a carrier fluid, a delayed acid generating component, a first reactant, and a second reactant, wherein the first and second reactants are selected for being capable of reacting together in an exothermic chemical reaction may be introduced into a portion of a subterranean formation or well bore. A chemical breaker also may be introduced into the portion of the subterranean formation (either separately or mixed together with one or more of the first and second reactants, carrier fluid, and/or delayed acid generating component). Examples of breakers that may be suitable for use in these embodiments include, but are not limited to, oxidizing breakers (e.g., sodium persulfate, sodium chlorite, ammonium persulfate, sodium perborate, etc.), enzyme breakers, encapsulated breakers, and the like. In certain embodiments, the breaker may be present in a fracturing fluid or other treatment fluid in the formation or well bore. After introducing the treatment composition into the subterranean formation or well bore, the delayed acid-generating component may hydrolyze in the carrier fluid to produce an acid, reducing the pH of the fluid to a level at which the exothermic reaction of the first and second reactants occurs. The heat generated in the exothermic reaction activates the breaker, which reduces the viscosity of the viscosified treatment fluid. The treatment fluid then may be more readily recovered out of the subterranean formation or well bore.

Because of the controllable and extended delay provided by the delayed acid-generating components used in the methods and compositions of the present disclosure, these treatments may be effective in very long well bores such as long horizontals and deep water wells where longer delays are needed to perform treatments with a viscosified treatment fluid before they are broken. Because of the controllable amount of heat generated using the methods and compositions of the present disclosure, this treatment can be customized for the amount heat needed to activate the chemical breaker used. This may be accomplished, for example, by using a computer program as further described below. As discussed below, in certain embodiments, the reaction of the first and second reactants may produce nitrogen gas, which may have additional utility in recovering the treatment fluid out of the subterranean formation (e.g., by flushing fluid out of pore spaces in a subterranean formation and/or proppant pack).

In another embodiment, the methods and compositions of the present disclosure may be used in conjunction with consolidation treatments used to consolidate sands and/or loose particulates in a subterranean formation to prevent flowback of those materials from a well. In particular, certain resin systems used to consolidate sands and/or loose particulates may be temperature activated. However, in certain cases, such resins may cure prematurely or in undesired locations (e.g., in the heel portion of a lateral, where the viscosity of the resin increases), which may hinder the resin from entering certain areas of the formation where sands or particulates reside. In accordance with the present disclosure, a resin system may be introduced into a portion of a subterranean formation or well bore where sands or loose particulates reside, wherein the curing temperature of the resin is higher than the bottomhole temperature in the formation or well bore, such that the resin may flow freely throughout the formation or well bore. The methods and compositions of the present disclosure may be used to generate the additional heat needed to cure the resin at a selected time and/or depth in the formation or well bore. In one such embodiment, a treatment composition comprising a carrier fluid, a delayed acid generating component, a first reactant, and a second reactant, wherein the first and second reactants are selected for being capable of reacting together in an exothermic chemical reaction may be introduced into a portion of a subterranean formation or well bore. A resin system also may be introduced into the portion of the subterranean formation (either separately or mixed together with one or more of the first and second reactants, carrier fluid, and/or delayed acid generating component). Examples of resin systems that may be suitable for use in these embodiments include, but are not limited to, butyl glycidyl ether resins, butyl lactate resins, phosphate ester resins, bisphenol A resins, novoloc resins, cyclohexane dimethanol diglycidyl ether resins, epichlorohydrin resins, derivatives thereof, and combinations thereof. Certain of these resin systems may include hardeners such as cycloaliphatic amine derivatives, 4,4 diamino diphenyl sulfone, polyoxypropylene diamine, diethylenetoluene diamine, isophrone diamine, derivatives thereof, and combinations thereof. After introducing the treatment composition into the subterranean formation or well bore, the delayed acid-generating component may hydrolyze in the carrier fluid to produce an acid, reducing the pH of the fluid to a level at which the exothermic reaction of the first and second reactants occurs. The heat generated in the exothermic reaction allows the resin to cure at the selected time and/or depth.

Because of the controllable and extended delay provided by the delayed acid-generating components used in the methods and compositions of the present disclosure, these treatments may be effective in very long well bores such as long horizontals and deep water wells where longer delays are needed to deliver resins before they cure or their viscosities increase. Because of the controllable amount of heat generated using the methods and compositions of the present disclosure, this treatment can be customized for the amount heat needed to cure the resin used. This may be accomplished, for example, by using a computer program as further described below. As discussed below, in certain embodiments, the reaction of the first and second reactants may produce nitrogen gas, which may have additional utility in preventing the resin from clogging pore spaces in the formation and/or particulate pack.

As noted above, in certain embodiments of the present disclosure, the exothermic reaction of the first and second reactants may generate nitrogen gas. Such nitrogen gas may be used, among other purposes, to generate a foamed fluid, which may be used in fracturing operations, fluid diversion, or other subterranean treatments. For example, a treatment composition comprising a carrier fluid, a delayed acid generating component, a first reactant, and a second reactant, wherein the first and second reactants are selected for being capable of reacting together in an exothermic chemical reaction may be introduced into a portion of a subterranean formation in which hydrocarbons are to be produced. The reaction of the first and second reactants may produce nitrogen gas that foams one or more fluids in the portion of the formation. This may generate an increase in the pressure exerted on the subterranean formation, which may create and/or enhance one or more fractures in the formation. In another embodiment, the foamed fluid may act as a diverting agent to divert the flow of other fluids to another portion of the subterranean formation (e.g., a less permeable portion of the subterranean formation). In other embodiments, nitrogen gas generated using a method or treatment composition of the present disclosure may be used to assist in returning wells to production, drillstem or production testing of heavy oil reservoirs, back surging, wax removal, artificial gas lift applications, formation consolidation, fluid diversion, conformance, and other types of operations. Nitrogen gas also may be used to aid in the back production of liquid from a well bore penetrating a portion of a subterranean formation and help prevent the formation of water blocks therein. In these and other applications, it may be advantageous to generate such nitrogen in situ using a reaction between a first and second reactant triggered by, among other reasons, to reduce the amount of friction in pumping a foamed fluid to a desired location downhole and/or to eliminate the need for specialized equipment needed to store, maintain, and vaporize liquid nitrogen at a job site.

The methods and compositions disclosed herein may directly or indirectly affect one or more components or pieces of equipment associated with the preparation and/or delivery, the disclosed compositions. For example, and with reference to FIG. 1, the disclosed methods and compositions may directly or indirectly affect one or more components or pieces of equipment associated with an injection system 10, which may be used to pump a treatment composition of the present disclosure into a pipeline 20, according to one or more embodiments. Referring now to FIG. 1, an injection system 10 may be arranged to communicate with pipeline 20 at a suitable location, for example, where the hydrocarbons are introduced into the pipeline after processing. A valve 25 may regulate the flow of hydrocarbons from that source into the pipeline 20. A first tank 30 containing a solution of the first reactant and a second tank 40 containing a solution of the second reactant may be connected to the pipeline in parallel via separate injection tubes 31 and 41 each being equipped with a pump 32 or 42 and valve 33 or 43. A third tank or hopper 50 containing the delayed acid-generating component may be connected to either injection tube 31 (as shown) or 41 such that the acid-generating component can be combined with the other components of the treatment composition before injection into the pipeline 20. In other embodiments, the tank or hopper containing the delayed acid generating component may be connected to pipeline separately from the injection tubes carrying the first and second reactants. Injection tubes 31 and 41 may merge at a point 60 immediately upstream of the pipeline 20 such that there contents are injected into the pipeline 20 together. Additional valves 70 may be used to regulate the flow of the treatment composition into the pipeline 20. In other embodiments, injection tubes 31 and 41 may be connected to the pipeline separately, such that the first and second reactants may be introduced into the pipeline separately. After the first and second reactants and delayed acid generating component are injected into the pipeline 20, the exothermic reaction resulting from the reaction of the first and second reactants may heat at least a portion of the pipeline 20, which may assist in removing deposits of paraffin wax, asphaltenes, and/or tar from the pipeline. An additional valve 27 may regulate the flow of hydrocarbons mixed with the first and second reactants into the pipeline 20.

As noted above, the delay and/or amount of heat generated in the methods and compositions of the present disclosure may be adjusted for the requirements of a particular operation or treatment, for example, by varying the amounts of the first and second reactants, the amount and/or type of the delayed acid generating component, the addition of one or more additional additives (e.g., a base), and other factors. In certain embodiments of the present disclosure, a computerized information handling system or computer program may be designed and/or used to determine the types and/or amounts of the first and second reactants, the delayed acid generating components, and/or other additives (e.g., a base) to use based on, for example, the amount of heat and/or nitrogen gas required for a particular treatment operation, the desired delay in generating that heat and/or nitrogen gas, conditions in the formation or pipeline (e.g., well bore depth, temperature, pressure, presence of contaminants, etc.), and/or other parameters. For example, the computer program may use input relating to one or more parameters of a treatment operation (e.g., the desired delay in generating heat and/or nitrogen gas, conditions in the formation or pipeline, etc.), as well as other information, to determine an amount of heat required for at least a portion of the treatment operation prior to completing the treatment operation, and then determine an amount of one or more of a first reactant, a second reactant, or a delayed acid generating component to use in the treatment operation that will allow at least the first and second reactants to react in an exothermic chemical reaction that produces at least the amount of heat required for at least a portion of the treatment operation. In certain embodiments, the treatment operation comprises a subterranean treatment operation. In certain embodiments, the treatment operation comprises a pipeline treatment operation (e.g., a treatment to remove deposits of paraffins, asphaltenes, and/or tar from at least a portion of a pipeline). Such information handling systems and computer programs may be used prior to the treatment and/or operation to design the parameters of a method or treatment composition of the present disclosure that is tailored the desired results in a particular application. Such systems and/or programs may be incorporated into pre-existing computer systems and/or software programs that are known in the art and used by oilfield service providers and operators to design subterranean treatments and operations.

As would be appreciated by those of ordinary skill in the art, with the benefit of this disclosure, one or more computerized information handling systems may be used to implement the methods disclosed herein. Moreover, each information handling system may include a computer readable media and/or memory to store data generated by the subsystem, preset job performance requirements and standards, and/or a computer program as described above. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer or tablet device, a cellular telephone, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Any suitable processing application software package may be used by the information handling system to process data. In one embodiment, the software produces data that may be presented to the operation personnel in a variety of visual display presentations such as a display. In certain example system, the measured value set of parameters, the expected value set of parameters, or both may be displayed to the operator using the display. For example, the measured-value set of parameters may be juxtaposed to the expected-value set of parameters using the display, allowing the user to manually identify, characterize, or locate a downhole condition. The sets may be presented to the user in a graphical format (e.g., a chart) or in a textual format (e.g., a table of values).

In certain embodiments, different information handling systems may be communicatively coupled through a wired or wireless system to facilitate data transmission between the different subsystems. In certain embodiments, the information handling system may be communicatively coupled to an external communications interface. The external communications interface may permit the data from the information handling system to be remotely accessible (i.e., from a location other than the well site) by any remote information handling system communicatively coupled to the external communications interface via, for example, a satellite, a modem or wireless connections. In one embodiment, the external communications interface may include a router.

To facilitate a better understanding of the present disclosure, the following examples of certain aspects of embodiments are given. The following examples are not the only examples that could be given according to the present disclosure and are not intended to limit the scope of the disclosure or claims.

EXAMPLE

Figure 2:
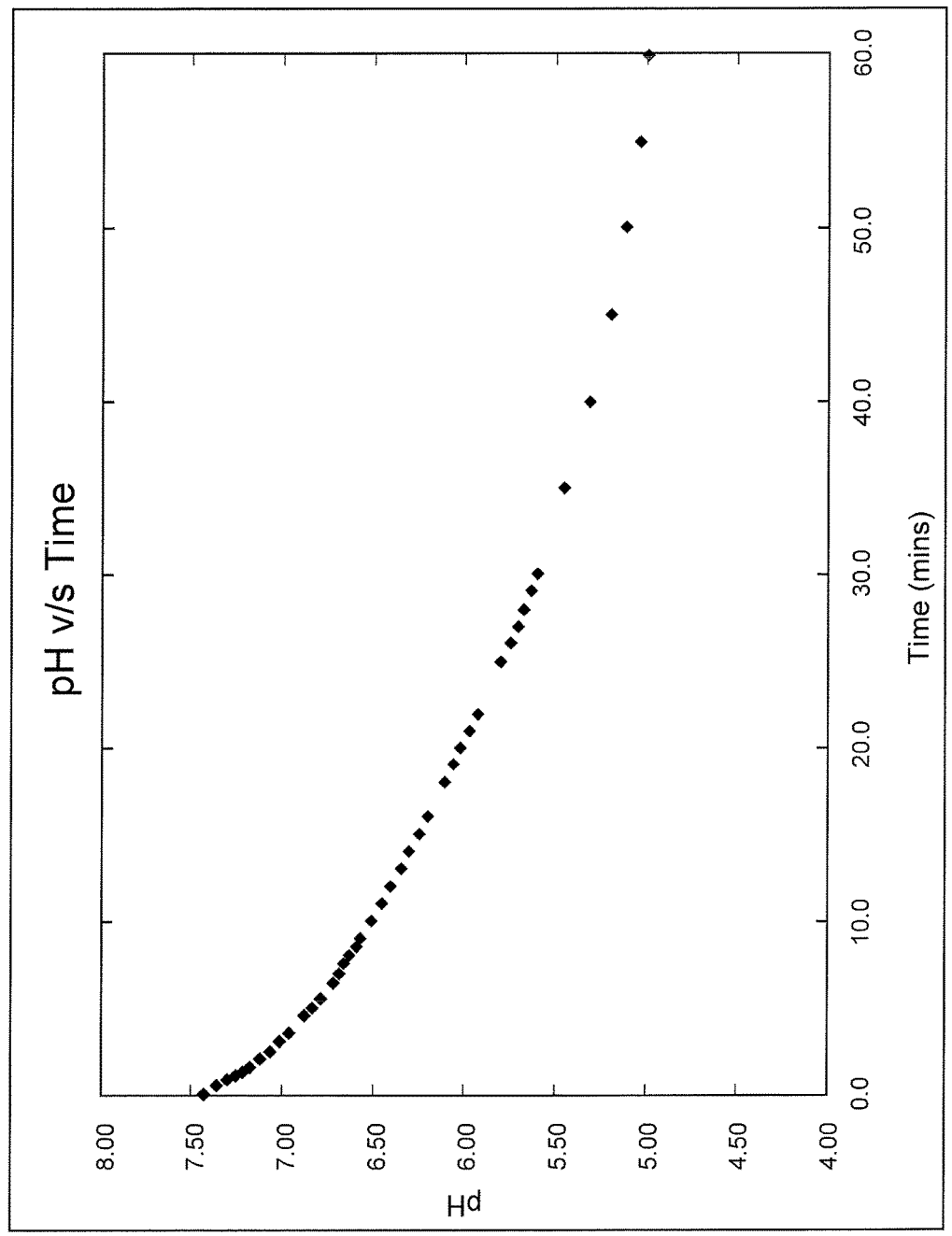
FIG. 2 is a graph illustrating data relating to the pH of a treatment solution according to one embodiment of the present disclosure.

A solution according to one embodiment of the present disclosure was created by mixing 8.025 g $NH_4Cl$ into 100 mL of water to create a 1.5M $NH_4Cl$ solution. The initial pH of this solution was 6.38 at room temperature (22.3° C.). 8 mL of MO-67 (an additive comprising 25% NaOH) was added to the solution, and the temperature was raised to 90° C. The pH of the solution at this temperature was 7.43. Then, 40 mL of N-FLOW 408 (a delayed acid generating component available from Halliburton Energy Services, Inc.) was added to the solution, and the pH of the solution was monitored over a 1 hour period. A plot of pH versus time for this solution is shown in FIG. 2.

As this data demonstrates, certain embodiments of the compositions of the present disclosure may give a delay of about 1 hour before the pH of a treatment fluid is reduced to a level at which an exothermic reaction between certain reactants (e.g., $NH_4Cl$ and $NaNO_2$) is triggered. In this example, $NaNO_2$ was not added since its addition would have raised the temperature of the solution to the boiling point at atmospheric pressure.

An embodiment of the present disclosure is a method comprising: providing a treatment composition comprising a carrier fluid, a delayed acid generating component, a first reactant, and a second reactant, wherein the first and second reactants are selected for being capable of reacting in an exothermic chemical reaction; and introducing the treatment composition into at least a portion of a subterranean formation.

Another embodiment of the present disclosure is a method comprising: providing a treatment composition comprising a carrier fluid, a delayed acid generating component, a first reactant, and a second reactant, wherein the first and second reactants are selected for being capable of reacting in a chemical reaction to produce nitrogen gas; and introducing the treatment composition into at least a portion of a subterranean formation.

Another embodiment of the present disclosure is a method comprising: providing treatment composition comprising a carrier fluid, a delayed acid generating component, a first reactant, and a second reactant, wherein the first and second reactants are selected for being capable of reacting in an exothermic chemical reaction; and introducing the treatment composition into at least a portion of a conduit or container.

Another embodiment of the present disclosure is a computer program stored in a tangible medium comprising a plurality of instructions that when executed cause at least one processor to: receive input relating to one or more parameters of a treatment operation; determine an amount of heat required for at least a portion of the treatment operation prior to completing the treatment operation based at least in part on the one or more parameters; determine an amount of one or more of a first reactant, a second reactant, or a delayed acid generating component to use in the treatment operation that will allow at least the first and second reactants to react in an exothermic chemical reaction that produces at least the amount of heat required for at least a portion of the treatment operation.

Another embodiment of the present disclosure is a computer system that comprises: at least one processor and a memory comprising executable instructions that, when executed by the processor, cause the processor to: receive input relating to one or more parameters of a treatment operation; determine an amount of heat required for at least a portion of the treatment operation prior to completing the treatment operation based at least in part on the one or more parameters; determine an amount of one or more of a first reactant, a second reactant, or a delayed acid generating component to use in the treatment operation that will allow at least the first and second reactants to react in an exothermic chemical reaction that produces at least the amount of heat required for at least a portion of the treatment operation.

Another embodiment of the present disclosure is a computer program stored in a tangible medium comprising a plurality of instructions that when executed cause at least one processor to: receive input relating to one or more parameters of a treatment operation; determine an amount of nitrogen gas required for at least a portion of the treatment operation prior to completing the treatment operation based at least in part on the one or more parameters; determine an amount of one or more of a first reactant, a second reactant, or a delayed acid generating component to use in the treatment operation that will allow at least the first and second reactants to react to produce at least the amount of nitrogen gas required for at least a portion of the treatment operation.

Another embodiment of the present disclosure is a computer system that comprises: at least one processor and a memory comprising executable instructions that, when executed by the processor, cause the processor to: receive input relating to one or more parameters of a treatment operation; determine an amount of nitrogen gas required for at least a portion of the treatment operation prior to completing the treatment operation based at least in part on the one or more parameters; determine an amount of one or more of a first reactant, a second reactant, or a delayed acid generating component to use in the treatment operation that will allow at least the first and second reactants to react to produce at least the amount of nitrogen gas required for at least a portion of the treatment operation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment composition comprising a carrier fluid, a delayed acid generating component, a first reactant, and a second reactant, wherein the first and second reactants are selected for being capable of reacting in an exothermic chemical reaction;
introducing the treatment composition into at least a portion of a subterranean formation;
introducing a curable resin system into the portion of the subterranean formation;
allowing the first and second reactants to react to produce an exothermic reaction; and
allowing heat from the exothermic reaction to at least partially cure the curable resin.

2. The method of claim 1 wherein one or more of the first reactant, the second reactant, and the delayed acid generating component are introduced into the portion of the subterranean formation separately from another component of the treatment composition.

3. The method of claim 1 wherein the first reactant comprises sodium nitrite and the second reactant comprises ammonium chloride.

4. The method of claim 1 wherein the delayed acid generating component comprises at least one compound selected from the group consisting of: a lactate, a lactic acid derivative, a glycerol ester, a glycerol polyester, an aliphatic polyester, a poly(lactide), a poly(glycolide), a poly($\epsilon$-caprolactone), a poly(hydroxy ester ether), a poly(hydroxybutyrate), an aliphatic polycarbonate, a poly(orthoester), a poly(amino acid), a poly(ethylene oxide), a polyphosphazene, and any combination thereof.

5. The method of claim 1 further comprising allowing the first and second reactants to react to produce an exothermic reaction after a delay of more than about 1 hour from when the treatment composition was introduced into at least a portion of the subterranean formation.

6. The method of claim 1 wherein one or more of the first reactant, the second reactant, or the delayed acid generating component are provided in an amount that is based at least in part on a predetermined amount of heat to be produced by the exothermic chemical reaction.

7. The method of claim 6 further comprising using a computer program to select the amount of one or more of the first reactant, the second reactant, or the delayed acid generating component provided based at least in part on a predetermined amount of heat to be produced by the exothermic chemical reaction.

8. The method of claim 1 wherein the curing temperature of the curable resin is above the bottomhole temperature in the portion of the subterranean formation.

9. The method of claim 1, wherein the curable resin system is selected from the group consisting of: butyl glycidyl ether resins, butyl lactate resins, phosphate ester resins, bisphenol A resins, novoloc resins, cyclohexane dimethanol diglycidyl ether resins, epichlorohydrin resins, derivatives thereof, and combinations thereof.

10. The method of claim 1, wherein the curable resin system further comprises a hardener.

11. The method of claim 10, wherein the hardener is selected from the group consisting of: cycloaliphatic amine derivatives, 4,4 diamino diphenyl sulfone, polyoxypropylene diamine, diethylenetoluene diamine, isophrone diamine, derivatives thereof, and combinations thereof.

12. The method of claim 1, wherein the delayed acid generating component further comprises an encapsulating material.

13. The method of claim 1, wherein the delayed acid generating component is provided in an amount sufficient to produce a drop in pH to trigger the exothermic reaction of the first and second reactants.

14. The method of claim 1, wherein the delayed acid generating component is present in an amount of from about 5% by volume to about 40% by volume.

15. The method of claim 1, wherein the first reactant further comprises an encapsulating material.

16. The method of claim 1, wherein the second reactant further comprises an encapsulating material.

17. The method of claim 1, wherein the first reactant comprises a source of cations and the second reactant comprises a source of anions.

18. The method of claim 1, wherein the exothermic reaction takes places at a pH of 5 or lower.

* * * * *